May 16, 1967   G. H. BOUCHARD ET AL   3,320,460
ELECTRIC LAMP COATING COMPRISING AGGLOMERATES
OF SILICA COATED WITH A PIGMENT
Filed Jan. 2, 1964
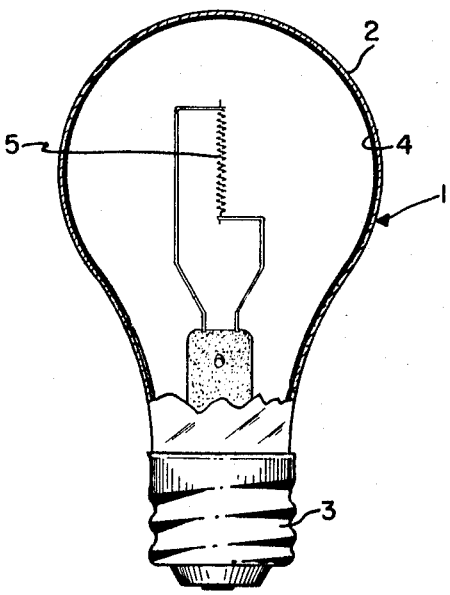
GEORGE H. BOUCHARD
ALEXANDER TARTAKOFF
HORACE H. HOMER
*INVENTORS*
BY Lawrence Burns
ATTORNEY

3,320,460
ELECTRIC LAMP COATING COMPRISING AGGLOMERATES OF SILICA COATED WITH A PIGMENT
George H. Bouchard, Ipswich, Alexander Tartakoff, Beverly, and Horace H. Homer, Arlington, Mass., assignors to Sylvania Electric Products Inc., a corporation of Delaware
Filed Jan. 2, 1964, Ser. No. 334,992
4 Claims. (Cl. 313—112)

This invention relates to a process for the manufacture of colored powders and a method of coating lamp bulbs with the powders. Although the invention is extremely useful in incandescent lamps, it is also useful in other types of lamps.

Powdered coatings have been applied to the interior surface of lamp bulbs by various methods, but the electrostatic method, as shown for example in the application of Gustin et al. Ser. No. 775,924 filed Nov. 24, 1958, has proven very effective. The electrostatic method has proved successful in coating with white and pastel shades, but attempts to use that method to produce deep colors have previously been unsuccessful. So-called insect-repellent lamps, which require a deep yellow color, have been especially difficult to coat. In such lamps, the blue light, which attracts insects, must be filtered out by the coating, and although many ways of mixing and grinding powders for such a coating had been tried, none had been successful in producing a coating that could be applied electrostatically and still have a saturated yellow color of high thermal stability.

The thermal stability of the color is essential, because the coated glass bulb must be sealed at its neck to a glass closure member called a flare, and the sealing is achieved by heating the glass to its softening or melting point, which is generally about 600° C. or more. Mere mechanical mixtures of silica and a pigment were not stable at such temperatures.

Accordingly, an object of our invention is the provision of a yellow powder which can be applied to a lamp bulb electrostatically to form a coating which has a saturated yellow color. Another is the provision of a thermally stable yellow coating.

A further object is the provision of powders in other colors, such as red, blue, orange and green, for example, which can be applied in a similar manner to give a good quality colored coating.

A feature of the invention is the use of powdered pigments whose particle size is in the sub-micron range.

Other objects, advantages and features of the invention will be apparent from the following specification, taken in conjunction with the drawing, in which the figure shows an incandescent lamp with a coating according to the invention.

In the figure, an incandescent lamp 1 has the sealed bulb 2 coated on its interior with the coating 4 of our invention, and the usual base 3 attached to one end. There is the usual refractory metal filament 5 inside the bulb as light source, but it is not visible through the coating.

In one example of the invention, we form a wet slurry of about 600 grams of yellow cadmium sulfide powder in about 8800 cc. of water, with about 600 grams of fine silica particles, the silica being a material of sub-micron particle size, say about one-half micron. The silica sold by the Philadelphia Quartz Company, Philadelphia, Pa., under the trademark "Quso" is satisfactory.

As the silica is brought in contact with the pigment it occludes the fine cadmium sulfide particles, producing an intimate mixture of much greater color density than that obtainable from any known mechanical mixing method, when applied to bulbs by electrostatic means. The density and uniformity of the resulting coating is much better than in previous electrostatic coatings.

In one example of the invention, we form a wet slurry of about 600 grams of fine silica particles and about 8800 grams of water, the silica being a precipitated type of sub-micron particle size, for example, the type sold under the trade-name "Quso G32" by the Philadelphia Quartz Company of Philadelphia, Pa. The particle size of the individual crystals of about 0.01 micron mean, that these small particles form agglomerates or clusters which have a mean particle size of about 2 microns.

The powdered yellow cadmium sulfide pigment, having a mean particle size of less than about a micron and preferably about 0.1 micron is then added to the slurry and stirred into it. The slurry is then spray dried, and the agglomerate particle size reduced by attrition grinding.

This results in a coating of the silica agglomerates by the pigment particles, which apparently fill the voids on the outside of the agglomerates, but not the inside voids. This gives a saturated color which cannot be obtained from a mere mechanical mixing of silica and pigment powders.

What we claim is:
1. An electric lamp bulb having an internal colored coating of particles comprising: an agglomerate of silica particles of sub-micron size, said agglomerate being coated with pigment particles on its outer surface.
2. An electric lamp comprising: a sealed glass bulb, an electrical-conductive refractory metal filament therein, and a colored coating on the inside of said bulb; said coating comprising agglomerates of sub-micron size silica particles, the agglomerates being coated on their outside surfaces with pigment particles.
3. The lamp of claim 2, in which the pigment particles are of cadmium sulfide.
4. The lamp of claim 2, in which the pigment particles are of cadmium sulfide and are larger than the silica particles but less than a micron in means size and less in size than the agglomerates of silica particles so that they can coat said agglomerates.

References Cited by the Examiner
UNITED STATES PATENTS
2,877,139   3/1959   Hyde _____ 313—116
3,024,381   3/1962   Dalton et al. _____ 313—112

FOREIGN PATENTS
695,081   8/1953   Great Britain.

JAMES W. LAWRENCE, *Primary Examiner.*
C. R. CAMPBELL, *Assistant Examiner.*